United States Patent
Müller et al.

(10) Patent No.: US 6,285,096 B1
(45) Date of Patent: Sep. 4, 2001

(54) SAFETY SWITCH ARRANGEMENT

(75) Inventors: Bernhard Müller, Herrenberg; Bernhard Wiesgickl, Vilseck; Michael Schiffmann, Amberg, all of (DE)

(73) Assignees: Leuze Electronic GmbH & Co., Owen/Teck; Siemens AG, Erlangen, both of (DE)

(*) Notice: Subject to any disclaimer, the term of this patent is extended or adjusted under 35 U.S.C. 154(b) by 0 days.

(21) Appl. No.: 09/671,477

(22) Filed: Sep. 27, 2000

Related U.S. Application Data

(63) Continuation of application No. 09/586,757, filed on Jun. 5, 2000, now abandoned.

(30) Foreign Application Priority Data

Jun. 4, 1999 (DE) .............................................. 199 25 552

(51) Int. Cl.[7] ...................................................... G05B 9/03
(52) U.S. Cl. ........................................... 307/326; 307/328
(58) Field of Search .................................. 307/326, 328; 192/129 A

(56) References Cited

U.S. PATENT DOCUMENTS

| | | | |
|---|---|---|---|
| 5,583,386 | * 12/1996 | Meixner et al. | 307/326 |
| 5,666,010 | * 9/1997 | Stratiotis | 307/328 |
| 5,796,341 | * 8/1998 | Stratiotis | 307/326 |
| 5,796,571 | * 8/1998 | Wetzel et al. | 307/326 |

FOREIGN PATENT DOCUMENTS 198 15 150 10/1998 (DE) .

OTHER PUBLICATIONS

Werner R. Kriesel at al., ASI–Das Aktuator–Sensor Interface für die Automation, Carl Hans Verlag München Wien, 1999.

* cited by examiner

*Primary Examiner*—Fritz Fleming
(74) *Attorney, Agent, or Firm*—Venable; Robert Kinberg; Catherine M. Voorhees

(57) ABSTRACT

The invention relates to a safety switch arrangement for switching the power supply of a tool on and off by means of at least two actuators. The actuators are connected to a code generator. The code generator can issue a numerical word divided into two partial words, the values of which can be influenced by a respective one of the at least two actuators. If the actuators are activated, the values for the partial words are changed continuously. As a result of the deactivation of an actuator, the assigned partial word assumes a fixed, predetermined value. In order to check the switching states of the actuators, the partial words are read synchronously into an evaluation unit. The power supply of the tool is switched "on" only when the at least two actuators are activated to the "on" state and the partial words correspond to the predetermined fixed value.

20 Claims, 5 Drawing Sheets

SAFETY SWITCH ARRANGEMENT

CROSS-REFERENCE TO RELATED APPLICATION

This application is a continuation of U.S. Ser. No. 09/586,757, filed Jun. 5, 2000, now abandoned, and claims the priority of German Patent Application No. 199 25 552.0, filed Jun. 4, 1999, the subject matter of which is incorporated herein by reference.

FIELD OF THE INVENTION

The invention relates to a safety switch arrangement.

BACKGROUND OF THE INVENTION

A safety switch arrangement of this type is known from German Patent 198 15 150 A1. This patent discloses an arrangement of sensors for monitoring a tool, wherein the tool is put into operation in dependence on the switching states of the sensors. The sensors function as slaves in a bus system operating according to the master-slave principle. The master is a control unit, which cyclically polls the slaves under predetermined addresses.

The sensors are light barriers having, respectively, one transmitter and one receiver, wherein each transmitter transmits light rays with an individual coding to the associated receiver. A redundant evaluation unit is connected to the bus system, which continuously monitors the signals transmitted via the bus system. The tool is made operational by the evaluation unit only in case of an error-free identification of the coding transmitted by the receivers via the bus system.

The arrangement has the advantage that errors in the transmission of signals via the bus system can be detected with a high degree of certainty by evaluating the coding in the evaluation unit.

For this, the sensors advantageously are not required to have a redundant design, but can still monitor the transmission of signals via the bus system with the level of safety that is required for using the arrangement in the area of protection of persons.

In place of sensors, actuators such as emergency-off switches can, in principle, also be connected as slaves in the bus system. Emergency-off switches of this type are designed to have two channels for safety reasons. Thus, each emergency-off switch has two contacts which are opened when the emergency-off switch is actuated. The state of a non-actuated emergency-off switch corresponds to the interference-free operation. Given a clear beam path and this operative state, the codings are transmitted to the evaluation unit in the same way as for a light barrier. The codings can be transmitted, for example, in the form of a 4-bit wide numerical word for which the value changes continuously according to a specific sequence. If the emergency-off switch is activated, it corresponds to an interference that is identical to an object interfering with the beam path of a light barrier. In that case, the emergency-off switch transmits a fixed value for the numerical word, which differs from the codings, to the evaluation unit so that the tool is shut down. The value for the numerical word for a 4-bit numerical word, for example, is "0000".

It is sufficient to open up one contact of the emergency-off switch to shut down the tool. However, a possible defect in the second contact of the emergency-off switch is not detected in that case. If the second contact of the emergency-off switch also fails, this can result in danger to the operating personnel for the tool, since the tool can no longer be shut down with the emergency-off switch.

BRIEF DESCRIPTION OF THE INVENTION

It is the object of the invention to design a safety switch arrangement of the aforementioned type in such a way that the tool cannot be put into operation if defective safety switches are present.

According to the invention, the safety switch arrangement comprises at least two actuators for switching on or switching off the power supply for the tool, wherein the power supply is activated only if both actuators are activated simultaneously.

The actuators are connected to a code generator. This code generator can issue a numerical word divided into two partial words, wherein the value of a partial word can be influenced respectively by one actuator. In order to test the switching states of the actuators, the partial words of the numerical word are read synchronously into the evaluation unit.

The values of the partial words respectively change continuously if the actuators are activated. The continuous change of the values of the partial words is recorded in the evaluation unit, whereupon the tool is put into operation.

As soon as one of the actuators is deactivated, the assigned partial word assumes a fixed value. In that case, only the values of the partial word that is assigned to the activated actuator still change. Accordingly, the two partial words assume a fixed value if both actuators are deactivated. Thus, it is easy to check which of the actuators is activated at specific points in time by evaluating the values for the two partial words.

The tool is released for operation only if both actuators are activated. As soon as at least one of the actuators is deactivated, the evaluation unit will record this deactivation as the value for the partial word does not change over time. As a result, the tool is shut down.

Owing to the division of the numerical word into partial words, it is possible to monitor each actuator separately via the code generator by using the safety switch arrangement according to the invention, which ensures a high error protection.

The two actuators in particular can also be the switching outputs of light barriers with a redundant design, light grids, and similar sensor devices which are used in the area of protection of persons. In particular, the two actuators can be redundant contacts of an emergency-off switch.

With applications of this type, particularly with emergency-off switches, malfunctions can occur as a result of line defects, so that individual actuators can no longer be switched off or deactivated. With emergency-off switches, this problem can result from a short circuit in the feed lines to one contact for the emergency-off switch. If this error occurs during or following the actuation of the emergency-off switch, then both contacts for the emergency-off switch are initially opened up or switched off. However, due to the short circuit in the feed lines of one of the emergency-off switch contacts, the value of short-circuited partial word continues to change while the value of the other partial word is held to a fixed value when its actuator is deactivated. The numerical word value consequently differs from a predetermined value, resulting in the tool being shut down.

If the tool is to be released again after a specified period of time, the emergency-off switch is actuated and thus released by the operating personnel. Since a short circuit is present in the feed line for one emergency-off switch contact, the value for the partial word assigned to the feed lines with the short circuit had already changed continuously prior to the activation of the emergency-off switch. This is recognized in the evaluation unit. A restart is thus prevented and an error message is issued, even though the values for both partial words change, owing to the activation of the emergency-off switch, which equals an error-free operation. A restart is possible only if both partial words have first assumed the fixed value "0000".

In principle, an error that occurs can also be stored non-volatile in the evaluation unit. In that case, a restart of the tool, e.g., following a repair, is possible only after a start-up test in which initially the emergency-off switch is not activated, then the emergency-off switch is activated and finally the emergency-off switch is deactivated. The tool is restarted only if the values for the partial words respectively correspond to the predetermined values.

BRIEF DESCRIPTION OF THE DRAWINGS

In the following, the invention is explained further with the aid of the drawings, wherein.

DETAILED DESCRIPTION OF THE INVENTION

Figure 1:
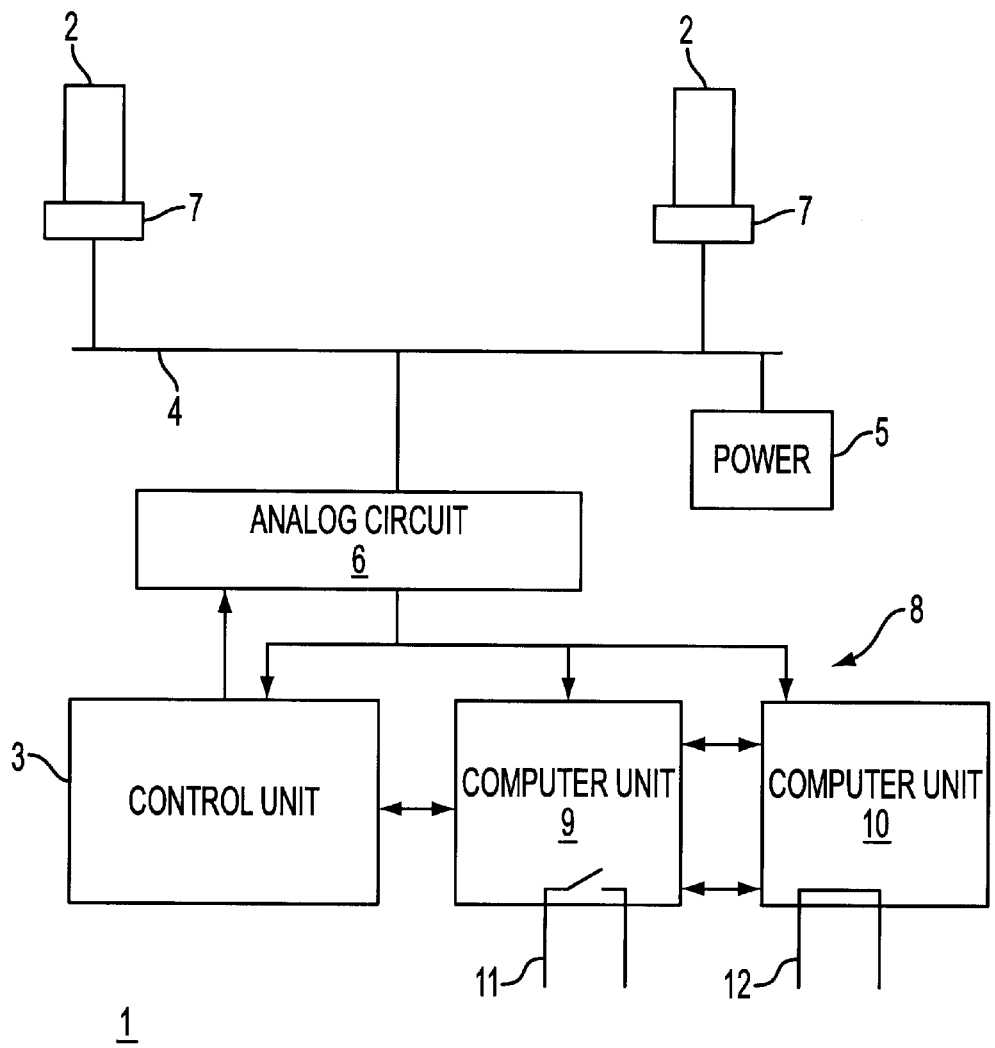
FIG. 1 is a block diagram of safety switch arrangements connected to a sensor/actuator bus system.

FIG. 1 shows a bus system 1 that operates according to the master/slave principle. Safety switch arrangements 2 with respectively two actuators are connected to this bus system 1. The safety switch arrangements 2 preferably form a component of redundant devices, which are used in the area of protection of persons.

The safety switch arrangements 2 form the slaves for the bus system 1. The bus system 1 is centrally controlled by the master, which is a control unit 3, for example an SPS control. Master and slaves are connected via bus lines 4, and power is supplied via a supply unit 5.

The master control unit 3 cyclically polls the individual slaves or safety switch arrangements 2 under predetermined addresses, whereupon each slave transmits a reply to the master control unit 3.

In the case at hand, the bus system 1 is an ASI bus system. The ASI bus system is designed in particular for the connection of binary sensors and actuators. The operating mode of the ASI bus system is described in "ASI—DAS AKTUATOR SENSOR INTEFACE FUR DIE AUTOMATION" [ASI—the Actuator Sensor Interface for Automation] by Werner Kriesel and Otto W. Madelung, Carl Hanser Publishing House, 1994.

A master request or command for this bus system 1 consists of a start bit, a 5 bit-wide address, a 2 bit control information, a 4 bit use data, as well as respectively one parity bit and one stop bit. A slave checks the received master request or command with the aid of predetermined ASI-specific coding rules as one of ordinary skill in the art would know. Alternatively, other known encoding schemes may be used. If the slave recognizes a valid master request or command, it transmits a respective response. In all other cases, the slave does not respond. In the same way, the master does not accept a slave response if it does not correspond to respective coding rules.

The data are Manchester-encoded and are transmitted as alternating, $sine^2$-shaped voltage pulses via the bus lines 4.

An analog circuit 6 is connected in series after the master control unit 3, which analog circuit comprises a transmitting element and a receiving element, both of which are not shown here. The binary data of a master request or command are converted in the transmitting element to a sequence of $sine^2$-shaped voltage pulses. These sequence signals are transmitted via the bus lines 4 to the slaves or safety switch arrangements 2. The signals transmitted by the slaves or safety switch arrangements 2 via the bus lines 4 to the master control unit 3 are converted in the receiving element to binary data sequences.

Each slave is assigned an interface module 7, which is an ASI-IC for the present embodiment. In interface module 7, the sequences of $sine^2$-shaped voltage pulses, received via the bus line 4, are converted to binary data. Furthermore, the slave response present in the form of binary data is converted in interface module 7 to a sequence of $sine^2$-shaped voltage pulses and is transmitted via the bus lines 4 to the master control unit 3.

A redundant evaluation unit 8, with two computer units 9, 10 that monitor each other, is connected to the bus system 1 for checking the signals transmitted via the bus lines 4. The computer units 9, 10 are preferably identically designed microprocessors. Evaluation unit 8 is neither a master nor a slave, but represents a purely passive bus component which continuously monitors the signals transmitted via the bus lines 4. In order to monitor the signals, evaluation unit 8 is connected to the analog circuit 6. The signals from the receiving element are read into the computer units 9, 10 of evaluation unit 8 and are compared cyclically therein.

Figure 4:
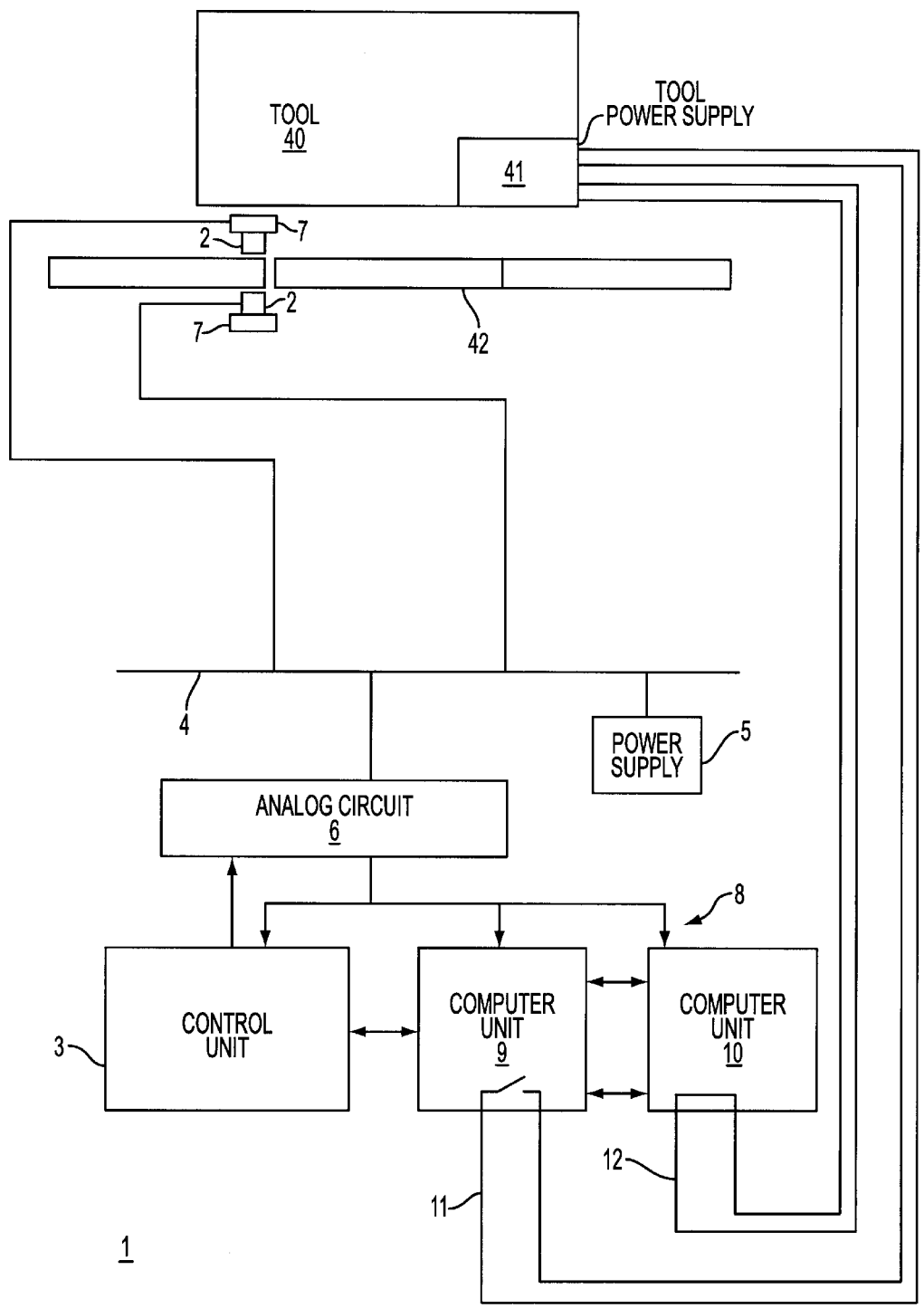

As shown in FIG. 4, each computer unit 9, 10 is provided with an output 11, 12, which is connected to the tool 40 via power supply 41 for the tool. The outputs 11, 12 are relay outputs or secure self-monitoring semiconductor outputs. The tool is put into operation via these outputs 11, 12.

For example, the safety switch arrangements 2 connected to the bus system 1 can take the form of one or several gate switches that function as actuators and monitor the opening state of a gate 42, which is provided for controlling access to the tool.

Figure 5:
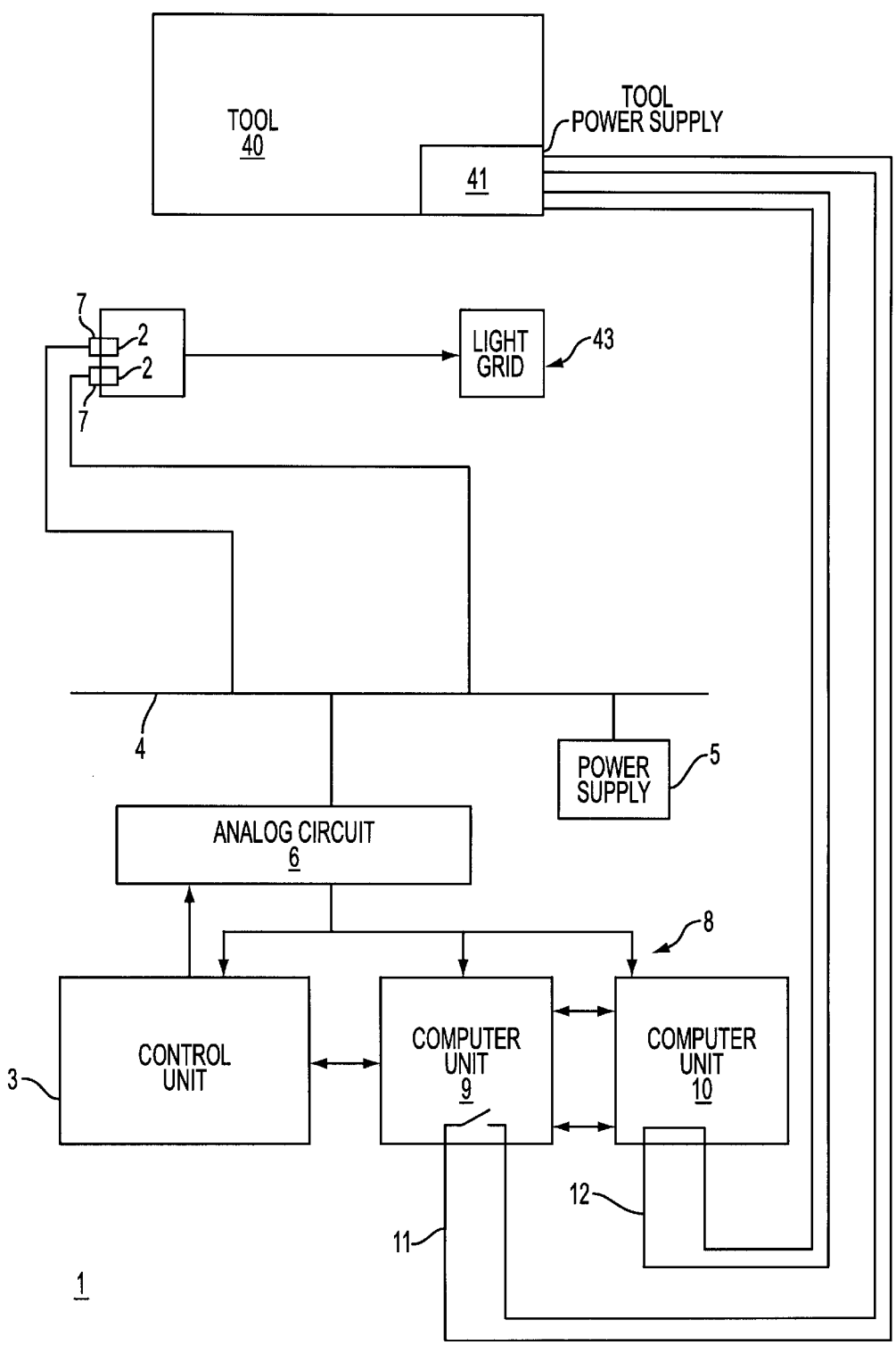

Alternatively, as shown in FIG. 5, the safety switch arrangements 2 can be light barriers, light grids, and other devices, which serve to monitor the approach areas of machines that constitute the tools. A light grid 43 or a light barrier of this type has a two-channel design in order to meet the safety requirements in the area of protection of persons. In particular, the switching states that form the output signals are emitted by way of a two-channel output, wherein each output is provided with an actuator. The actuators can be designed as relays, for example.

Figure 2:
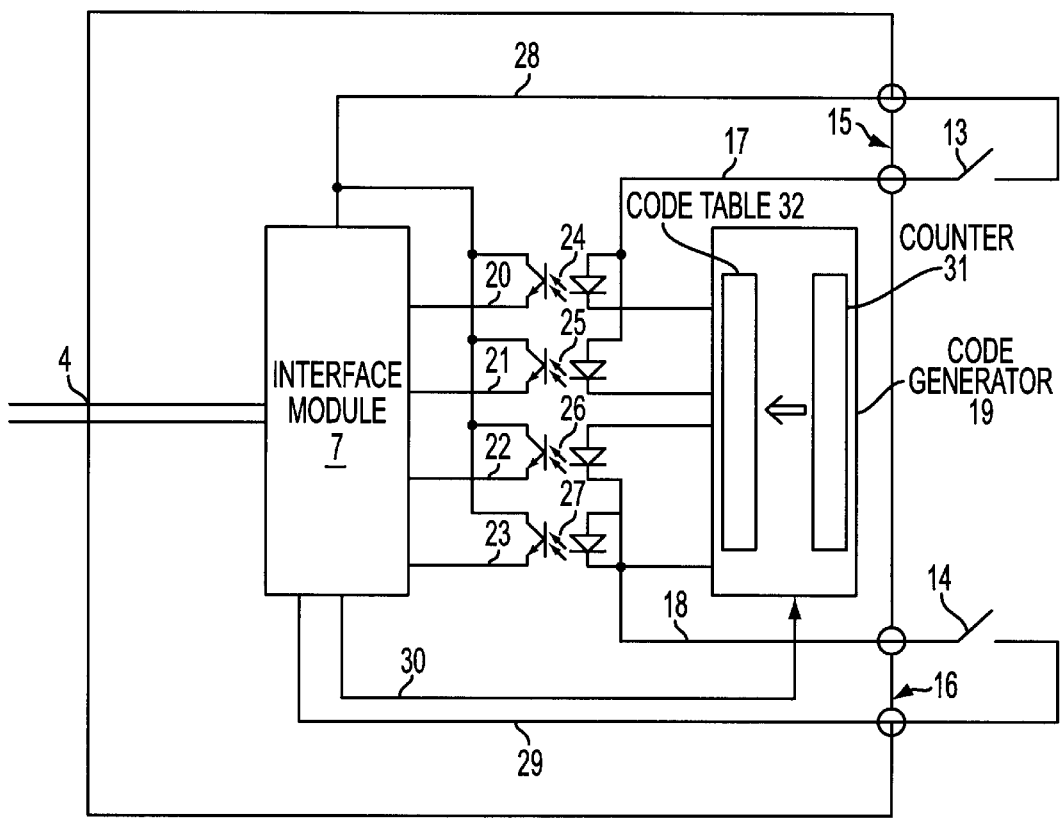
FIG. 2 is a block diagram of a first exemplary embodiment for a safety switch arrangement according to FIG. 1.
Figure 3:
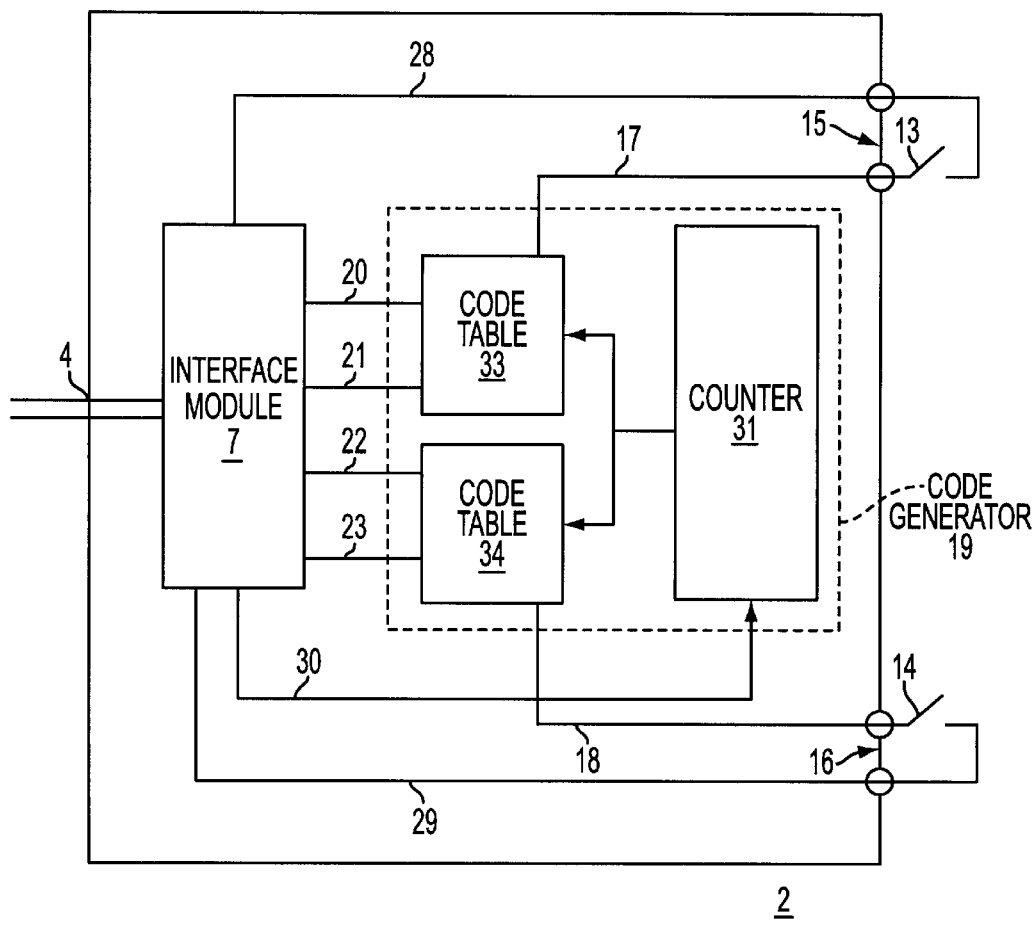
FIG. 3 is a block diagram of a second exemplary embodiment for a safety switch arrangement according to FIG. 1.

FIGS. 2 and 3 show exemplary embodiments, for which the safety switch arrangement 2 comprises a two-channel emergency-off switch. The safety switch arrangement 2 with emergency-off switch is connected via an interface module 7 to the bus system 1.

The emergency-off switch shown in FIG. 2 comprises two switch contacts 13, 14. Switch contacts 13, 14 function as actuators with respective connections 15, 16 connected to respective separate feed lines 17, 18 to the outputs of a code generator 19. That is, as long as switch contact 13 or 14 is closed, numbers values generated in code generator 19 are read into interface module 7.

The code generator 19, for example, is integrated into a microcontroller and generates a numerical word which is configured as a 4-bit wide binary numerical word for the present exemplary embodiment. The bits for this numerical word are read into one input D0–D3 of interface module 7 via respectively separate signal lines 20–23. The numerical word is transmitted from interface module 7 there via the bus lines 4 to evaluation unit 8. A separate optocoupler 24–27 is provided in each signal line 20–23 for a galvanic separation of interface module 7 and code generator 19.

The numerical word is divided into two partial words. The first two bits of the numerical word are read by the code generator 19 via the inputs D0 and D1 into interface module 7 and form the first partial word. The last two bits of the numerical word are read by the code generator 19 via the inputs D2 and D3 into interface module 7, and form the second partial word.

Respectively one feed line 28, 29 leads from each emergency-off switch contact connection directly to interface module 7. These feed lines 28–29 provide the positive or negative supply voltage for the optocouplers 24–27. Furthermore, in order to clock the signal transmission between code generator 19 and interface module 7, a data/strobe signal is transmitted via an additional feed line 30 from interface module 7 to the code generator 19.

The feed line 17 associated with the first switch contact 13 for the emergency-off switch is conducted to the optocouplers 24, 25 that are connected to the inputs D0 and D1 of interface module 7. The feed line 18 associated with the second switch contact 14 is conducted in the same way to the other optocouplers 26, 27 at the inputs D2 and D3 of interface module 7. The first switch contact 13 of the emergency-off switch thus can influence the value of the first partial word via the feed line 17. The value of the second partial word can be influenced via the feed line 18 by the second switch contact 14 of the emergency-off switch.

The code generator 19 comprises a pseudo random number generator for continuously changing the value of the numerical word, issued by the code generator 19.

For the present exemplary embodiment, the pseudo random number generator comprises a counter 31 and a code table 32. Different values for the numerical word are stored in the code table 32 under different addresses. The code table 32 for the present exemplary embodiment comprises a total of fourteen different values, which are in the range of "0001" to "1110". The counter 31 is designed as modulo-8-counter and assumes counter readings in the range of 0 to 7, wherein the individual counter readings create addresses, under which the individual values are stored in the code table 19. Depending on which address is generated by the counter 31, the corresponding value is read out of the code table 32 and is read as numerical word via the signal lines 20–23 into interface module 7. As a result of the continuous incrementing upward of counter 31, the addresses are changed continuously, so that the values for the numerical word are also changed continuously.

The switch contacts 13, 14 are open as long as the emergency-off switch is not activated, which corresponds to the activation of these actuators. In that case, the continuously changing values of the numerical word are read by the code generator 19 into interface module 7 and are transmitted from there via the bus lines 4 to evaluation unit 8. The advantage of this invention here is that the width of the numerical word corresponds to the word width of the use data transmitted via the bus system 1. The continuously changing value of the numerical word is recorded in evaluation unit 8, so that evaluation unit 8 can put the connected tool into operation.

If one of the two switch contacts 13 or 14 is opened or switched off, the transmission of the corresponding partial word via the signal lines 20, 21 or 22, 23 is interrupted. Thus, the time-constant value 00 or 11 is read via the signal lines 20, 21 or 22, 23, and the inputs D0 and D1 or D2 and D3 are read into interface module 7 in place of the changing partial word that is generated by the code generator 19.

The partial words are read as a numerical word synchronously from interface module 7 into evaluation unit 8. The values for the numerical word that is generated by the code generator are preferably stored in evaluation unit 8 as desired values.

If one of the switch contacts 13 or 14 is opened or switched off, the evaluation unit 8 records that the partial word assigned to this switch 13 or 14 no longer changes. Following this, evaluation unit 8 shuts down the tool because this signifies an activation of the emergency-off switch or a defect in the safety switch arrangement 2.

The tool is shut down via evaluation unit 8, even if both switch contacts 13 and 14 are actuated, because both partial words of the numerical word assume a constant value which deviates from the values for the numerical word generated in the code generator 19.

The tool is restarted only if both partial words first assume the fixed value "00" while the tool is connected, which corresponds to an opening of both switch contacts 13 and 14. If one of the partial words is still changing while the tool is shut down, a short circuit exists between lines 17, 28 or 18, 29 of the respective switch contact 13 or 14. Thus, this feature prevents a startup of the tool, since the values for both partial words are changing while the emergency-off switch is not activated.

FIG. 3 shows a modification of the exemplary embodiment according to FIG. 2. The design for the exemplary embodiment according to FIG. 3 corresponds essentially to the design of the exemplary embodiment in FIG. 2.

In contrast to the exemplary embodiment according to FIG. 2, the arrangement in FIG. 3 is provided with a pseudo random number generator which comprises a counter 31 and two code tables 33, 34. In each of the two code tables 33, 34, the values for the individual partial words are respectively stored with addresses, wherein the addresses of the two code tables 33, 34 are in agreement. The counter 31, in turn, continuously generates addresses with which the values of both partial words are request or commanded up synchronously from the two code tables 33, 34. Following this, the values for the partial words, which complement each other to form the value of the numerical word, are read synchronously via the signal lines 20–23 into interface module 7.

While this invention has been particularly shown and described with reference to preferred embodiments thereof, it will be understood by those skilled in the art that various changes in form and details may be made therein without departing from the spirit and scope of the invention as defined by the appended claims.

We claim:

1. A safety switch arrangement for switching on and off a power supply of a tool, said safety switch arrangement comprising:

two actuators, each actuator being switchable between an "on" state and an "off" state;

a code generator connected to said two actuators, said code generator issuing a numerical word that is divided into two partial words each having a value, each partial word being influenced by a respective one of said two actuators wherein values for the partial words are changed continuously when the actuators are activated to the "on" state and wherein when an actuator is deactivated to the "off" state, the partial word influenced by that actuator assumes a predetermined fixed value; and an evaluation unit for checking the switching states of said two actuators by synchronously reading the respective partial words of said two actuators, wherein the power supply is switched on only when both said two actuators are activated to the "on" state and the partial words, prior to the activation of the actuators, respectively correspond to the predetermined fixed value.

2. A safety switch arrangement according to claim 1, wherein access to the tool is secured by means of a gate, which is monitored with two actuators designed as gate switches.

3. A safety switch arrangement according to claim 1, wherein the tool is a machine and the area of approach for the machine is monitored by means of a light grid, comprising a two-channel output with respectively one actuator.

4. A safety switch arrangement according to claim 1, wherein said two actuators are switch contacts of a two-channel emergency-off switch.

5. A safety switch arrangement according to claim 1, wherein the code generator comprises a pseudo random number generator for changing the value of the numerical word.

6. A safety switch arrangement according to claim 5, wherein the pseudo random number generator comprises a counter and code table, various values for the numerical word are stored in the code table under addresses, and the counter successively generates addresses for request or commanding up the corresponding values from the code table.

7. A safety switch arrangement according to claim 5, wherein the pseudo random number generator comprises a counter and two code tables, different values for respectively one partial word are stored in each code table under addresses, and the counter successively generates addresses for the synchronous request or commanding up of the respective values from the two code tables.

8. A safety switch arrangement according to claim 5, wherein the numerical word is formed as a 4-bit wide binary numerical word.

9. A safety switch arrangement according to claim 8, wherein the each partial word is formed as a 2-bit binary partial word.

10. A safety switch arrangement according to claim 8, wherein each bit of the numerical word is respectively read out via a signal line at the output of code generator.

11. A safety switch arrangement according to claim 8, wherein said two actuators are connected by means of separate feed lines to the code generator, by way of which the switching state of the actuator is read into the code generator, and wherein, for a switching state that corresponds to the time prior to the activation of an actuator, the signal lines of the assigned partial word assume the bit values 00 or 11.

12. A safety switch arrangement according to claim 11, wherein the pseudo random number generator comprises a counter and at least one code table and binary random values in the range of 0001 to 1110 are stored in the at least one code table.

13. A safety switch arrangement according to claim 12, wherein the counter is designed as a modulo-8-counter with counter readings in the range of 0 to 7, said counter readings forming the addresses.

14. A safety switch arrangement according to claim 1, wherein the evaluation unit has a redundant design.

15. A safety switch arrangement according to claim 1, further comprising a bus system connected to the evaluation unit said bus system being controlled by a control unit wherein the evaluation unit continuously monitors the signals transmitted via the bus system.

16. A safety switch arrangement according to claim 15, wherein said two actuators are connected via a respective interface module to the bus system.

17. A safety switch arrangement according to claim 16, wherein signal lines at the output of the code generator are conducted to respectively one input D0–D3 of an interface module for transmitting the numerical word bits.

18. A safety switch arrangement according to claim 15, wherein the bus system operates according to the master/slave principle, and the control unit functions as the master.

19. A safety switch arrangement according to claim 4, wherein when the power supply for the tool is shut down due to an error, this error is stored non-volatile in the evaluation unit, prior to switching on the power supply for the tool, the emergency-off switch is initially not activated, then the emergency-off switch, is activated and subsequently the emergency-off switch is deactivated, and the power supply for the tool will be switched on if the evaluation unit records the respective values for the partial words during the above process.

20. A safety switch arrangement according to claim 1, wherein the power supply is switched on only when both said two actuators are activated to the "on" state simultaneously.

* * * * *